D. H. TWAITS.
GREASE CUP.
APPLICATION FILED MAR. 13, 1914.
1,226,725.
Patented May 22, 1917.
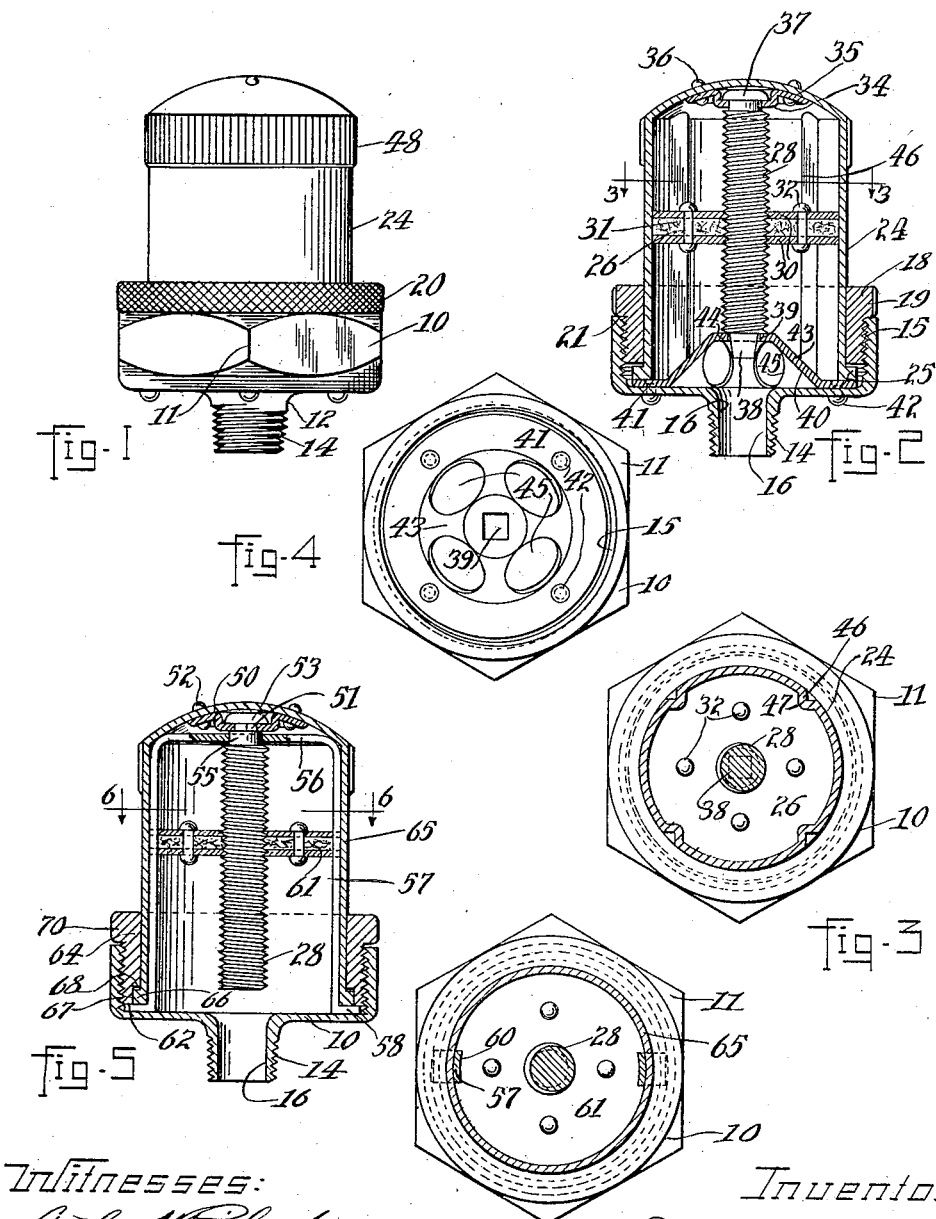

UNITED STATES PATENT OFFICE.

DANIEL H. TWAITS, OF CHICAGO, ILLINOIS.

GREASE-CUP.

1,226,725.  Specification of Letters Patent.  Patented May 22, 1917.

Application filed March 13, 1914. Serial No. 824,352.

*To all whom it may concern:*

Be it known that I, DANIEL H. TWAITS, a citizen of the United States, residing at Chicago, in the county of Cook and State of Illinois, have invented a certain new and useful Improvement in Grease-Cups, of which the following is a full, clear, and exact description, reference being had to the accompanying drawings.

This invention is for a grease cup of a type wherein there is a base portion, a cap carried thereby and a plunger within the cap for forcing the grease from the interior thereof to the surfaces to be lubricated.

The general object of the invention is to provide such a cup which shall be very simple in construction, durable and efficient in operation. A more specific object is to provide a cup in which the cap portion itself may be rotated to move the plunger longitudinally therein, thereby avoiding the use of a wing or other means projecting outside the cap to move the plunger, such as are commonly used in this type of cup. Another object is to so arrange the cup that there is a minimum amount of machine threading necessary in its construction.

These and other objects will become apparent in the following description and the essential characteristics are hereinafter set forth in the claims.

Referring to the drawings: Figure 1 is a side elevation of my grease cup; Fig. 2 is a vertical central section through the same; Fig. 3 is a horizontal section taken on the line 3—3 of Fig. 2; Fig. 4 is a plan of the base member with the cap removed; Fig. 5 is a vertical central section showing a modified construction of my grease cup; Fig. 6 is a horizontal section of the same taken on the line 6—6 of Fig. 5.

In the drawings, 10 indicates a grease cup base having an external angular portion 11, preferably hexagonal as shown, below which is formed a hollow stem 12, externally threaded as at 14. The upper portion of the base is cup-shaped, having internal threads 15, and opening downwardly to the passage 16 of the stem, through which the grease is led to the bearing surfaces. Coöperating with the threads 15 are external threads of a bushing 18 preferably having an outwardly projecting flange 19, which is knurled as at 20 to provide for screwing the same into position, the shoulder 21 limiting its downward movement. Instead of the knurl at 20, I may provide any suitable means for rotating this bushing, such as making the exterior thereof angular or providing lugs or wings thereon, or providing the periphery with holes adapted for the use of a spanner wrench.

This bushing fits over the cylindrical exterior of a cap member 24, allowing the rotation of the cap therein, and the lower end of the bushing engages the upper side of an outwardly turned flange 25, thereby holding the cap in position but allowing rotation thereof. Within the cap is provided a plunger 26, adapted to be moved toward the base to force grease from the interior of the cup by means of a screw 28 which is non-rotatable when the cap is in position. As shown this plunger comprises two metal disks 30, having a threaded engagement with the screw 28 between which is held a resilient washer-like member 31, adapted to engage the interior of the cap and the threads of the screw to prevent the leakage of grease past the plunger. These disks 30 may be connected, and secured on either side of the resilient member, by any suitable means, such as rivets shown at 32.

The screw 28 is rotatably secured to the top of the cap by means of a disk-like collar 34, having a portion of its upper surface formed to fit the interior of the top of the cap as at 35, and secured thereto by any suitable means such as electric welding or rivets 36. This disk is offset, forming a space for a head 37, upset at the top of the screw to hold the same in place, allowing the rotation thereof. When the cap is in position on the base as shown, a non-circular projection 38 preferably tapering downwardly, integral with the lower end of this screw, fits into an opening 39 in a non-rotatable washer-like member 40, secured to the base at 41, by any suitable means, such as electric welding or rivets 42, as shown. This washer preferably extends upwardly into the cap as at 43, and then has a flat portion 44 through which is made the opening 39. In this upwardly extending portion 43, may be made perforations 45 of any suitable shape or size, to allow the passage of grease from the interior of the cap to the passage 16 of the stem. To rotate the plunger with the cap, I provide vertical ribs on one of these members engaging corresponding grooves on the other. As shown, the ribs 46 extend inwardly from the cap and engage corresponding vertical grooves 47 in the plunger 26.

When the cap is in the position shown, having been filled with grease, to force the grease through the stem it is only necessary to rotate the cap, thereby rotating the plunger about the screw 28 in the proper direction to move the plunger downwardly, the screw being held against rotation by the projection 38 engaging the washer-like member 40, thereby forcing the grease through the opening 45 to the stem.

A suitable knurl 48 provides a suitable hand grip at the upper portion of the cap as well as preventing the bushing 19 from becoming removed from the cap when being refilled, as the knurled portion extends outwardly from the exterior surface.

Referring to the modified construction shown particularly in Figs. 5 and 6, the screw is rigidly carried by the cap, and rotatable therewith, being free at its lower end. It is secured by a disk-like member 50, engaged by an angular portion 51 at the upper end of the screw and secured to the top of the cap by electric welding or by rivets 52. The screw has an upset head 53, securely holding the screw to the disk-like portion 50, which has an offset intermediate portion forming a recess for this head. Below the disk is a round or circular portion 55 of the screw, forming a shoulder engaging the under side of the disk and forming a rotatable bearing in a strip 56, extending to the sides of the cap and downwardly as at 57, and having its lower end 58 turned outwardly and resting on the bottom of the base. These depending portions of the strip engage notches 60 in a plunger 61 similar to the plunger above described, and thereby prevent the rotation of the same, the strip being held when the cap is in position by the lower edge 62 of a bushing 64, similar to the bushing above described, engaging the end of the portions 58 and clamping them to the bottom of the cup portion of the base.

The cap 65 is similar to the cap above described, except that it has no ribs or grooves, and its outwardly turned flange 66 fits into an undercut portion 67 of the bushing 64, and a shoulder 68 prevents the upward movement of the cap but allows the rotation thereof. In this construction the length of the threaded portion of the bushing is such that the under side of the flange 70 does not engage the top of the wall of the base, as in the form above described, but allows the lower edge 62 only, to engage the portions 58 of the strips, thereby giving the full clamping effect and securely holding the strip against rotation. In this form the screw 28 is of such a length that it allows the grease to pass beneath it through the passage 16 of the stem.

In each of the constructions described, the screw 28 is shown as supported at its upper end by a separate member secured to the under side of the top of the cap. This provides for greater neatness of appearance of the cup, leaving the top smooth. That is in the first form, the screw could be rotatably carried by the top of the cap, merely having the head 37 upset at the upper side of the cap, while allowing the rotation of the screw. In the other form the screw could be rigidly secured to the top of the cap by extending it through and upsetting, or by any other suitable means.

Now when the cap is filled with grease, and secured in position on the base, the plunger 61 may be forced downwardly to force grease from the cup by rotating the cap, thereby rotating the screw 28. The portions 57 of the strips acting as guides to prevent the rotation of the plunger, allows the action of the screw 28 to move the same.

Having thus described my invention, what I claim is:

1. In a grease cup the combination of a base member, a cap member rotatably carried thereby, a plunger within the cap, a threaded member extending through and engaging the plunger, and means whereby the plunger may be moved upon the rotation of the cap.

2. In a grease cup the combination of a base, a cap, a member rotatably embracing the cap and removably secured to the base, a plunger member within the cap, a threaded member engaging the threads of the plunger member, means for rotating one of said members by the cap, and means for holding the other member against rotation whereby the plunger moves along its axis.

3. In a grease cup the combination of a base, a cap, a clamping ring rotatably connecting the cap to the base, a plunger member vertically movable within said cap, a threaded member engaging said plunger, means for holding one of said members against rotation, and means for rotating the other member by the cap whereby the plunger member is moved along its axis.

4. In a grease cup the combination of a base having a threaded portion, a cap carried by the base and having an annular shoulder, an annular member coöperating with the threads of the base and engaging said shoulder allowing the rotation of the cap, a plunger within the cap, and threaded means for moving the plunger consequent upon the rotation of the cap.

5. In a grease cup the combination of a base member having an upwardly extending wall, internal threads on said wall, a cap carried by the base, a bushing slidable over the exterior of the cap having threads coöperating with the threads of the base having an annular shoulder, a shoulder on the cap engaged thereby, a plunger member within the cap, a threaded member engaging said plunger, and means for holding one of said members against rotation while rotating the other with the cap to move the plunger along its axis.

6. In a grease cup the combination of a base member having a threaded portion, a cap mounted thereon and having an outwardly turned flange, a ring surrounding the cap and having a shoulder engaging said flange and threads coöperating with the threads of the base whereby the cap is rotatably secured to the base, a plunger member within the cap, a threaded member engaging the plunger, means for holding one of said members against rotation, and means for rotating the other with the cap to move the plunger along its axis.

7. In a grease cup the combination of a base member, a cap rotatably carried thereby, a plunger movable within the cap, and having a central internally threaded opening, an externally threaded screw occupying said opening, means for holding the screw against rotation, and means for rotating the plunger with the cap.

8. In a grease cup the combination of a base member, a cap rotatably carried by the base, a vertically movable plunger within the cap, means for holding it against relative rotation with the cap, a screw extending through and engaging said plunger, and means carried by the base for preventing the rotation of said screw.

9. In a grease cup the combination of a base having a hollow stem, a cap rotatably carried by the base, a plunger within the cap, means for preventing its rotation with relation to the cap, a screw engaging said plunger rotatably carried by the top of the cap and having a non-circular projection at its lower end, a rigid member carried by the base and removably engaging said non-circular projection allowing the removal of the cap but preventing the rotation of the screw.

10. In a grease cup the combination of a base member, a cap member rotatably carried thereon, a screw mounted axially within the cap, means carried by the base preventing the rotation of said screw, a plunger member having a threaded engagement with said screw, one of said members having ribs and the other having grooves slidably fitting the same whereby the plunger may be rotated by the cap.

11. In a grease cup, the combination of a base member, a cap member mounted thereon and having an annular shoulder, and a collar threaded onto the base and engaging said shoulder to hold the cap in position while allowing it to rotate, and a vertically movable plunger within the cap operated by the rotation of the cap.

12. In a grease cup, the combination of a base member having an upwardly extending cup-shaped portion, a cap member adapted to be carried by the base and having an outwardly extending annular shoulder, a collar surrounding the cap member and engaging the threads on the base and rotatably engaging said shoulder to hold the cap in position, and a vertically movable plunger within the cap operated by the rotation of the cap.

In testimony whereof, I hereunto affix my signature in the presence of two witnesses.

DANIEL H. TWAITS.

Witnesses:
 GEO. A. ROCKWOOD,
 GERTRUDE G. MAHER.

Copies of this patent may be obtained for five cents each, by addressing the "Commissioner of Patents, Washington, D. C."